March 18, 1941. S. SCHLESS 2,235,176
PROCESS FOR PREPARING POROUS PLATES FROM CEMENT AND
FIBROUS MATERIAL ON BOARD-MAKING MACHINES
Filed July 16, 1937
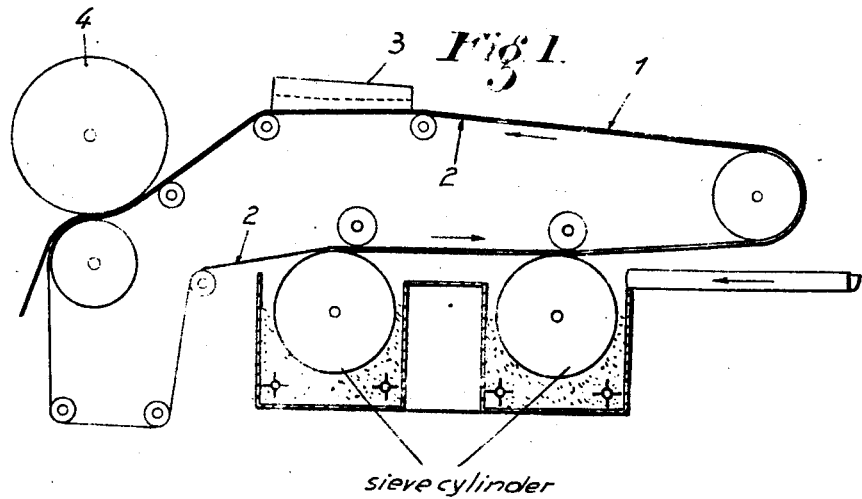
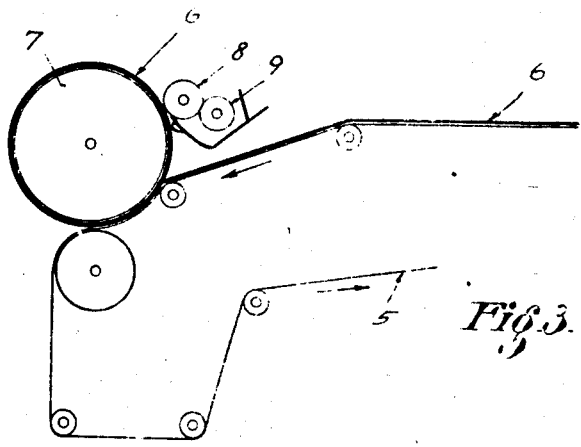
Inventor:
Stefan Schless.

Patented Mar. 18, 1941

2,235,176

UNITED STATES PATENT OFFICE 2,235,176

PROCESS FOR PREPARING POROUS PLATES FROM CEMENT AND FIBROUS MATERIAL ON BOARD-MAKING MACHINES

Stefan Schless, Berlin-Wilmersdorf, Germany, assignor of thirty per cent to Fritz Quade, Berlin-Zehlendorf, Germany Application July 16, 1937, Serial No. 154,077
In Germany August 22, 1936

4 Claims. (Cl. 92—66)

Structural plates are manufactured on board-making machines from cement and inorganic fibrous substances, such as asbestos, or organic fibrous substances, such as cellulose, the mixture of cement and fibrous substances coming from the hollander being applied uninterruptedly to the forming or shaping roller from the sieve cylinder by means of an endless felt band or belt. When the forming or shaping roller has taken up a sufficiently thick layer then the substance wound on it is cut apart. In this way for example webs of 125 cm. width and 250 cm. length are obtained, which are placed flat and allowed to set and dry.

The plates prepared in this way are compact. Attempts have been made to introduce pores into them by adding a raising agent, such as aluminium or calcium carbide, to the mixture in the hollander. However, before the mixture reached the board-making machine it had already begun to rise so that it was impossible in this way to obtain structural plates of uniform porosity.

According to the present invention the raising agent is not added in the hollander but is first supplied to the layer which the cement-fibre material mixture forms on the felt belt or on the forming or shaping roller.

According to one mode of carrying out the invention the raising agent, e. g. aluminium is sieved or blown on to the felt belt which forwards the cement-fibrous material mixture from the sieve cylinder to the shaping or forming roller. The plates taken off the shaping roller contain only relatively little water. In order to ensure a sufficient rise the plates are dipped into water, whereby so much water is sucked up that the raising agent can exert its effect. The plates are laid during the raising and setting between adjustable shelves of a rack. In this way it is ensured that the upper and lower surfaces of the plates are perfectly plane and that the plates themselves acquire the desired thickness.

By adding more or less raising agent it is possible to obtain very highly porous structural plates or plates of lower porosity. Also the aplication of the raising agent can be now and again completely interrupted and in this way plates obtained the inner layers of which are porous owing to the sieving-on of raising agent or agents, whilst the outer layers are pore-free and compact.

In the accompanying drawing: Fig. 1 is a sectional elevation of one modification of the apparatus employed.

Fig. 2 is a cross-sectional view of an article which may be produced by this invention.

Fig. 3 is a fragmentary view, similar to Fig. 1, of another modification of the apparatus.

For example, a layer 1 in Fig. 1 2.5 m. long may not have raising agent dusted on on the felt belt 2, then with the aid of an automatic device 3 raising agent may be applied to a layer 10 m. long, and the following 2.5 m. left free from raising agent again, so that after winding up by the shaping or forming roller 4 a plate 6 mm. thick can be cut off the upper and lower layers of which are free from raising agent, whilst the 4 mm. thick middle layer contains raising agent. If this plate is dipped into water and placed between shelves of a rack situated 10 mm. apart then finally a plate is obtained the upper and lower layers of which (a in Fig. 2) are free from pores whilst in the middle there is a porous layer (b) 8 mm. thick. Such plates have very poor sound and temperature transmitting powers and, when asbestos fibres are used for their production, satisfy, at a thickness of 15 mm. the most stringent regulations of the authorities as regards resistance to fire and protection from excessive heating of the parts lying behind them.

According to a second form of carrying out the invention the raising agent is applied not on the felt band or belt 5 in Fig. 3 but during the rolling of the film 6 consisting of fibrous materials and hydraulic binding agents on to the shaping or forming roller 7. In this case the application of the raising agent is best effected with the aid of automatically adjustable applying rollers 8 and 9 such as are known in the printing art. The adjustability of the applying rollers and the interruption of the application can be most accurately regulated in this way, the raising agent can be very uniformly distributed, and, whether now in powder form or as paste, be transferred from the applying rollers to the shaping or forming rollers.

In order to increase the resistivity towards very high temperatures one can, in addition to the cement, also add carbonate of lime to the mixture with the fibrous substances.

It will be readily understood that when aluminium is employed as raising agent it will exert its raising action only in the presence of alkali. Most cements are of course alkaline in themselves, but when employing aluminium care must be taken that the cement is slightly alkaline.

The plates provided by the present invention can be used in place of the double plates heretofore employed in the constructional art, which are obtained by uniting together (e. g. cementing together) a compact plate of greater hardness with a porous plate of special insulating capability towards sound, coldness and heat.

What I claim is:

1. In a process for making sheets of hydraulic cement containing fibrous material in which a mixture comprising fibrous material and hydraulic cement is prepared, the mixture is formed into a layer, and the layer is wound upon itself to form a hollow cylinder; the steps comprising applying aluminium powder to the formed cementitious layer, cutting the wall of the formed cylinder and flattening it out to form at least one sheet, moistening the sheets with water, and placing the moistened sheets between limiting plane surfaces disposed at a fixed distance apart, the aluminium powder reacting with the cementitious material to form hydrogen gas whereby the sheets are expanded to an extent limited by the plane surfaces.

2. In a process for making sheets of hydraulic cement containing fibrous material in which a mixture comprising fibrous material and hydraulic cement is prepared, the mixture is formed into a layer, and the layer is wound upon itself to form a hollow cylinder; the steps comprising applying aluminium powder to the formed cementitious layer before it is wound upon itself, cutting the wall of the formed cylinder and flattening it out to form at least one sheet, moistening the sheets with water, and placing the moistened sheets between limiting plane surfaces disposed at a fixed distance apart, the aluminium powder reacting with the cementitious material to form hydrogen gas whereby the sheets are expanded to an extent limited by the plane surfaces.

3. In a process for making sheets of hydraulic cement containing fibrous material in which a mixture comprising fibrous material and hydraulic cement is prepared, the mixture is formed into a layer, and the layer is wound upon itself to form a hollow cylinder; the steps comprising applying aluminium powder to the formed cementitious layer while it is being wound upon itself, cutting the wall of the formed cylinder and flattening it out to form at least one sheet, moistening the sheets with water, and placing the moistened sheets between limiting plane surfaces disposed at a fixed distance apart, the aluminium powder reacting with the cementitious material to form hydrogen gas whereby the sheets are expanded to an extent limited by the plane surfaces.

4. In a process for making sheets of hydraulic cement containing fibrous material in which a mixture comprising fibrous material and hydraulic cement is prepared, the mixture is formed into a layer, and the layer is wound upon itself to form a hollow cylinder; the steps comprising applying aluminium powder to the formed cementitious layer at spaced intervals thereon, cutting the wall of the formed cylinder and flattening it out to form at least one sheet, moistening the sheets with water, and placing the moistened sheets between limiting plane surfaces disposed at a fixed distance apart, the aluminium powder reacting with the cementitious material to form hydrogen gas whereby the sheets are expanded to an extent limited by the plane surfaces.

STEFAN SCHLESS.